United States Patent [19]
Whitehead

[11] Patent Number: 5,549,262
[45] Date of Patent: Aug. 27, 1996

[54] HOSE GUIDE

[75] Inventor: Stephen P. Whitehead, Elgin, Ill.

[73] Assignee: Suncast Corporation, Batavia, Ill.

[21] Appl. No.: 471,120

[22] Filed: Jun. 6, 1995

[51] Int. Cl.⁶ .................................................. A47G 29/00
[52] U.S. Cl. ............................................. 248/87; 239/276
[58] Field of Search .................................. 248/75, 76, 85, 248/87, 88, 545, 156; 188/32; 239/276, 273

[56] References Cited

U.S. PATENT DOCUMENTS

| | | | |
|---|---|---|---|
| 2,865,673 | 12/1958 | Hathaway | 248/88 X |
| 3,473,770 | 10/1969 | Edgerton | 248/87 |
| 4,135,668 | 1/1979 | Winkler et al. | 248/87 X |
| 4,836,432 | 6/1989 | Violette . | |
| 4,895,225 | 1/1990 | Parnell . | |
| 4,944,476 | 7/1990 | Olson | 248/87 |
| 5,158,254 | 10/1992 | Remby . | |

*Primary Examiner*—Ramon O. Ramirez
*Attorney, Agent, or Firm*—McHale & Slavin, P.A.

[57] ABSTRACT

The instant invention is a low cost hose guide consisting of a one-piece spike having a first pointed end and a second flat surface available for tapping the pointed end into the ground. The spike includes locking tabs for placement of a single piece roller that is engaged in an area above the locking tabs and below the second surface and is rotatable around the spike. Once the hose guide is positioned into the ground a hose may be dragged around the hose guide wherein the hose guide maintains the hose in a guided fashion so as to prevent damage to critical areas such as flower beds and infant vegetation.

13 Claims, 2 Drawing Sheets

HOSE GUIDE

FIELD OF THE INVENTION

The instant invention relates to landscape maintenance and more particularly to a device for guiding a water hose around fragile landscape areas such as flower beds that may be damaged from the movement of such a hose.

BACKGROUND OF THE INVENTION

Nearly every structure, whether it be a residence or business address, utilizes an outside water faucet. The outside water faucet may provide pressurized water for washing the facade of the structure, a vehicle parked near the structure, or simply access to water for sprinkling a landscaped area around the structure. Despite the convenience of an outside water faucet, it is impractical to perform all watering tasks directly in front of the faucet. The need to transfer water to a desired location is well known and typically performed by use of a water hose. In residential applications a water hose, or garden hose includes provisions for connecting one end of hose to the water faucet leaving a free end for attachment to a water distribution device such as a sprinkler or spray nozzle.

A problem arises during the use of a garden hose in that the inner volume of the hose is filled with water adding weight to the hose. Since water weighs approximately 7 pounds per gallon, a length of hose filled with water becomes a weighted object and when dragged across a landscape can easily smash flowers or other fragile objects in its path. While it would be most beneficial to have a second individual assist in guiding a hose to prevent such damage, typically a faucet is turned on allowing water to run through the hose wherein a lone individual drags the free end of the hose creating a long swath of weighted pipe which may disrupt tender landscape matter.

A particular problem arises when a hose is dragged around a flower bed since most flowers are fragile and susceptible to damage by objects having less mass than a filled water hose. The weight of a hose, and movement thereof operates as a sawing action that can quickly cut down an entire flower bed. This problem is not limited to movement of a hose around a flower garden as the washing of a vehicle also provides numerous obstacles that can snag the hose. For instance, when a hose is dragged around an automobile tire it can easily snag beneath a tire. In a typical residence there are numerous obstacles that may interfere with hose movement such as trees, steps, fences, statues, light posts, swing sets, gardens, and so forth. A weighted hose is difficult to move around any object, even the corner of a building as the weight of the hose can easily snag on the edge.

Various devices exist to address these problems such as U.S. Pat. No. 4,836,432 which discloses a U-shaped hose guide having a flexible body that attaches around the front of a tire. The device provides a smooth surface so as to prevent lodgment of a hose along the bottom of a tire when a vehicle is washed.

U.S. Pat. No. 4,895,225 discloses yet another hose guide for use around an automobile tire. This device operates as a chock and is wedged along a side surface of the tire to prevent the hose from being trapped beneath the tire.

U.S. Pat. No. 5,158,254 discloses another hose guiding device which includes a conduit member with a centrally disposed aperture. A garden hose is fed through the conduit which is staked to the ground providing a directional aperture for guiding of the hose. The problem with an aperture based guide is the need to move the device if the hose is moved in an opposite direction.

A multiple piece roller spike is also known in the art but is manufactured from a roller having two sections allowing a hose to jam during use.

Thus, what is needed in the art is an inexpensive, simplified hose guide that may be inserted into the ground in a temporary or permanent manner for guiding a hose to prevent landscape damage and snagging of the hose against objects.

SUMMARY OF THE INVENTION

The instant invention teaches a water hose guide having a primary purpose for use protecting landscape areas from damage caused by the movement of a weighted garden hose. The invention consists of a one piece spike constructed of plastic having outwardly extending ribs to provide additional surface area for insertion holding. On one end of the spike is a narrow insertion point to assist in ground insertion with the ribs increasing in size to an enlarged distal end forming a flat top allowing for the pounding of the spike by use of a hammer or the like weight object. Uni-directional locking tabs are placed along the ribs to engage a roller assembly that is slid from the insertion end over the locking tabs and used for maintaining the roller in a rotatable position along the distal end.

The second component of the invention is a roller formed from a single piece of plastic having a circular shape with a flat upper and lower surface. The upper surface has an oversized upper perimeter edge having a first diameter adjoining to a side wall surface which is dimensionally reduced in size to a second diameter from the upper edge to a centrally disposed C-shaped section to an enlarged lower edge of a third diameter. The upper edge prevents a garden hose from lifting over the roller as it is being dragged around the device. The roller facilitates movement of the hose by providing a rounded center section receptive to the outer diameter of the hose. A hose slides around the roller as the roller rotates around the spike. The lower edge of the roller has an outer diameter less than the upper diameter allowing a hose to be lifted from the ground surface into the C-shaped section between the perimeter edges.

Thus, an objective of the instant invention is to provide an inexpensive water hose guide having a roller member that is positionable along the length of a spike with provisions for maintaining a hose within a rounded center section of the roller wherein the spike is installed into the ground by tapping with a weight object.

Yet another objective of the instant invention is to provide a water hose guide which accommodates conventional garden hoses.

Still another objective of the instant invention is to provide a water hose guide that can be positioned in either a temporary or permanent manner and in nearly any location for directing the hose around obstacles.

Yet another objective of the instant invention is to provide a device that has a low profile so as not to distract from a landscaping display.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
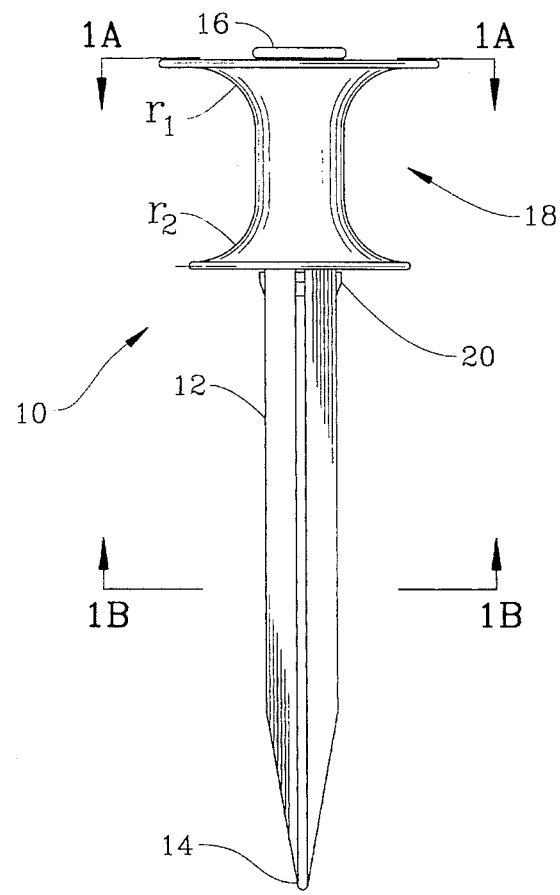
FIG. 1 is a side view of the instant invention.
Figure 2:
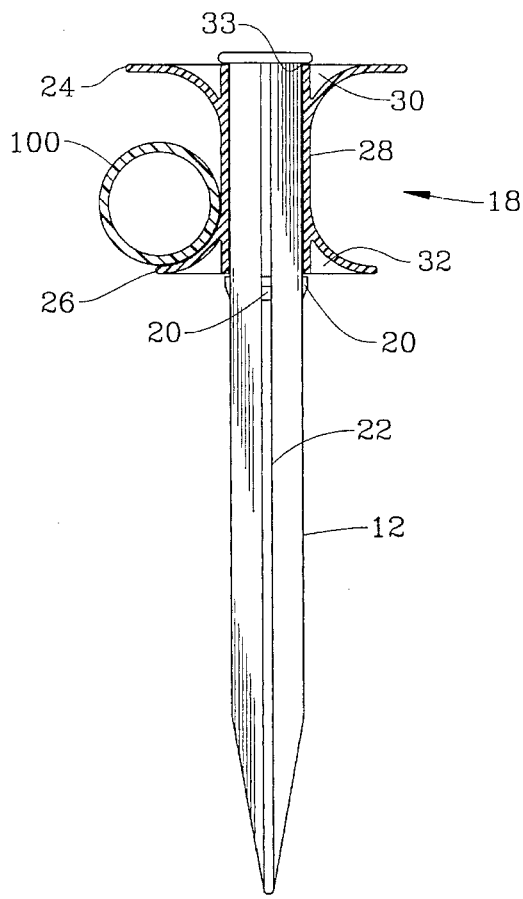
FIG. 2 is a cross-sectional view of FIG. 1 including the garden hose.

Referring in general to FIGS. 1 and 2, the hose guide device 10 of the instant invention consists of a spike 12 with a and roller 18 rotatably coupled to the spike. The spike is defined by a first end 14 and a flat second end 16. The first end 14 is angled to a point for ease of insertion into the ground when the flat end 16 is tapped with a weighted object such as a hammer. The spike 12 has a cross-section formed by four equally spaced outwardly extending ribs 22. The ribbed cross-section provides rigidity to the plastic using minimal rib width and resistance upon insertion into the ground yet provides superior ground holding ability by the increased surface area provided by the cross-sectional format. The spike is inserted into the ground by simply placing the pointed end 14 at the desired location and tapping the flat second end 16 with a hammer, the end of a shoe or any other weighted object. Locking tabs 20 are located on an outer edge of each rib for holding the roller 18 against the second end 16.

The roller 18 is constructed from a single piece of plastic and circular in shape. The roller 18 is rotatably positioned on the spike 12 between the second end 16 and an upper surface of locking tabs 20 allowing the roller 18 to rotate about the axis of the spike 12. The locking tabs are uni-directional each having a side wall sloped outwardly from said rib a predefined distance leading to a raised ridge having an upper surface formed perpendicular to the spike providing a support shoulder allowing the roller to rotate about the spike with the lower surface of the roller resting on the locking tab shoulder. The roller 18 has an upper edge 24, a lower edge 26, and a side wall 28 therebetween. The side wall 28 forms a C-shaped curvature having an upper and lower radius of about 0.75 inches for use accommodating a conventional hose 100. A centrally disposed aperture having a height of approximately 2.5 inches assimilates a tube with the C-shaped side wall 28 molded thereto forming void area 30 along the upper surface and void area 32 along the bottom surface. Hose 100 is depicted against sidewall 28 in a similar format as would be employed when the device is inserted into the ground.

Figure 1A:
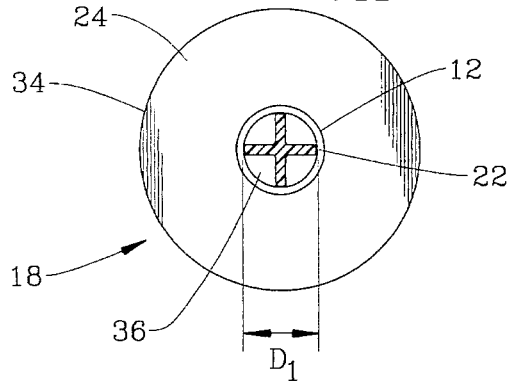
FIG. 1A is a top view of FIG. 1.
Figure 1B:
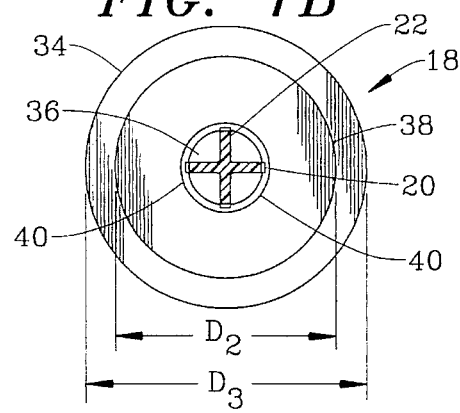
FIG. 1B is a bottom view of FIG. 1.

Now referring to FIG. 1A, a top view of the roller 18 is shown with upper perimeter edge 34 having a diameter of $D_1$ approximately 3.375 inches. Aperture 36 is centrally disposed having an upper diameter opening of approximately 0.865 inches which gradually increases in diameter to approximately 8.80 inches providing a close tolerance for the spike 12 placed through the center of the aperture 36. Each outwardly extending rib 22 frictionally engages the inner surface of the aperture 36 providing stability for rotation around the spike 12. As shown in FIG. 1B a bottom view of the roller 18 is set forth with the bottom edge of the roller having a diameter $D_2$ of approximately 2.645 inches. Each rib 22 includes a locking tab 20 raised from the edge of the rib about 0.05 inches from a forward slope of 15 degrees allowing for engagement of tube end 40 forming the side wall to aperture 36. The locking tab is uni-directional and only allows for insertion of the roller which is installed by causing a slight deformation of the roller member until the locking tabs are placed beneath the lower surface of the roller. As the roller is constructed of plastic, the deformation is only temporary with the plastic retaining a memory of the molded shape. It is noted that the upper perimeter edge is larger than the lower perimeter edge while the upper diameter of the aperture is less than the lower diameter of the aperture.

Figure 3:
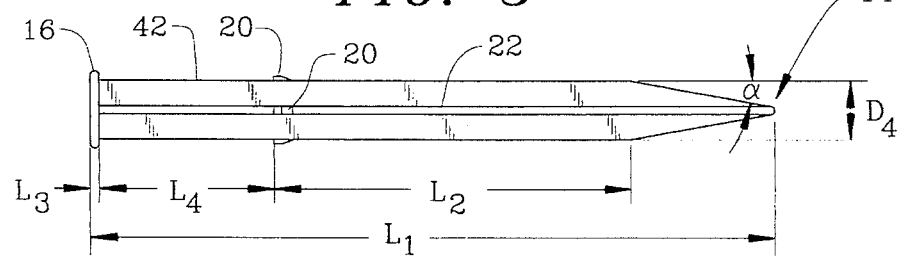
FIG. 3 is a side view of the spike of the instant invention.

FIG. 3 sets forth the one piece plastic spike which has an overall length $L_1$ of approximately 10 inches with a body length $L_2$ of approximately 7.8 inches, the remainder of which sets forth a curvature having an angular slope of 10° leading to the point 14 of the spike. The upper end 16 includes an enlarged lip $L_3$ of approximately 0.125 inches maintaining a spacing $L_4$ between the upper portion 16 and locking tabs 20 approximately 2.58 inches. By way of operation the roller is slid over the end 14 of the spike 12 with the sidewall of the aperture 36 riding over the surface of locking tabs 20 onto section 42 so as to lock the roller therebetween.

Figure 4:
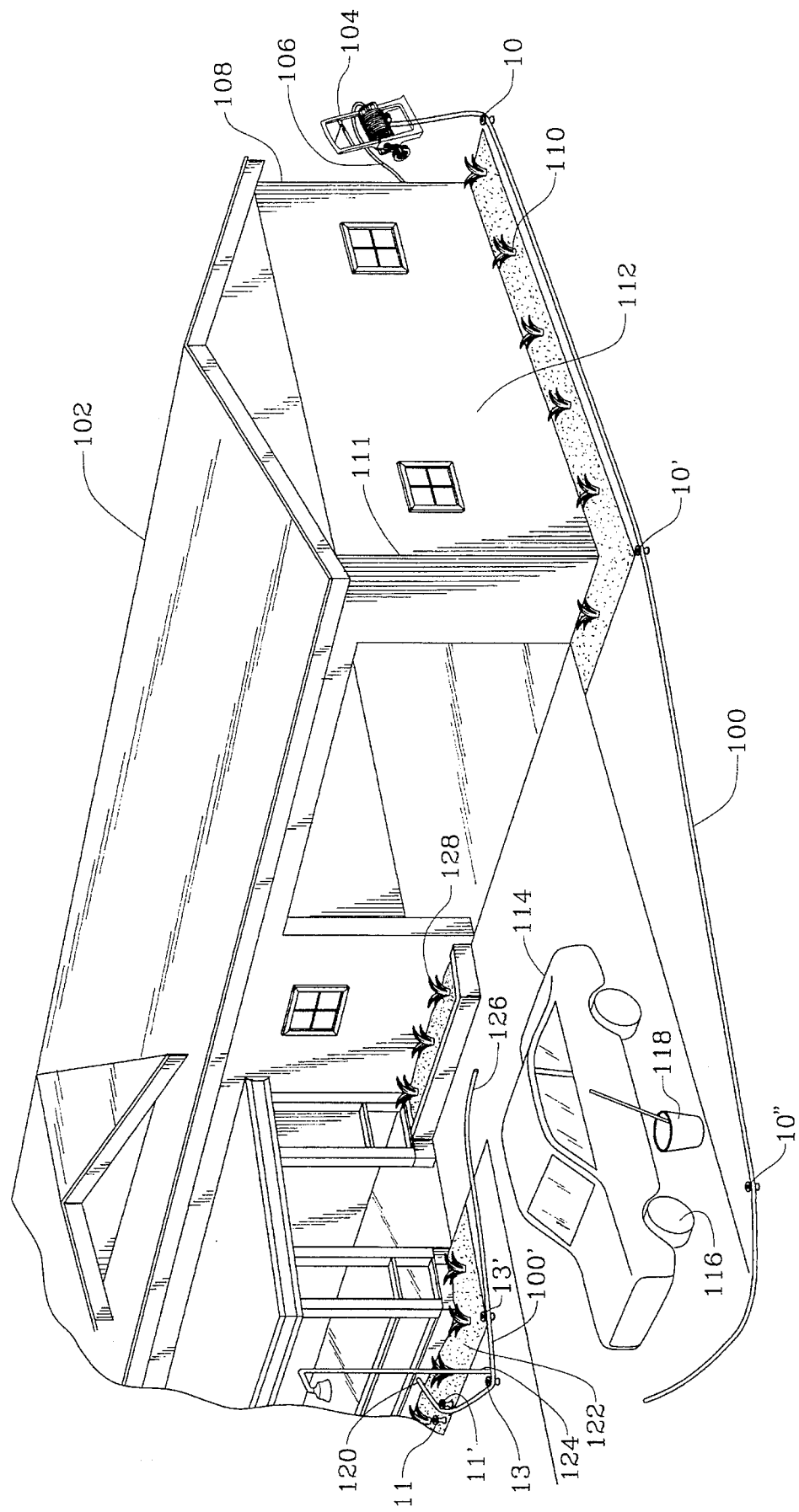
FIG. 4 is a pictorial view of a home with the instant invention used in conjunction with various watering accessories.

Now referring to FIG. 4, a pictorial view of a home 102 is depicted with various watering hoses set forth so as to depict the use of the instant invention. In one application a hose reel 104 is placed near an outside water faucet located at an end of reel coupling hose 106. In this instance the faucet is located behind the home 102 wherein water hose 100 is reeled off the spool of the hose reel 104 and pulled around the corner 108 and 111 of the home 102. In this illustration, flower garden 110 lines the side 112 of the home and if the hose 100 is pulled from the hose reel 104 in order to wash vehicle 114, the tendency of the hose 100 is to pull against the side 112 of the home resulting in damage to the flower garden 110. By placement of the hose guide 10 along corner 108, and guide 10' along corner 111, the hose 100 is guided around the flower bed 110 protecting the flowers from damage. In this embodiment it would be advantageous to leave the hose guide 10 and 10' in the ground at all times wherein retraction of the hose 100 into the hose reel 104 or movement from the hose 100 due to remotely located faucets protect critical areas as well as prevents snagging on sharp edges such as corners 108 and 111. In addition, a hose guide 10" may be temporarily mounted for purposes such as washing the vehicle 114, wherein the hose guide 10" operates as a forward guide to prevent snagging of the hose 100 underneath tire 116. This further prevents pulling of the hose 100 causing items such as the wash bucket 118 from sliding against side surface of the automobile 114. When car washing is complete, the hose can be simply reeled back to the hose reel cart 104 and temporary hose guide 10" removed with the flower bed 110 protected at all times.

In yet another example, water spigot 120 may be conveniently mounted in front of a home. The spigot is placed behind various bushes and shrubs 122 for aesthetic purposes. In such an instance, hose guide 11 and 11' may form an opening to the spigot allowing the garden hose to be removed from behind the bushes by dragging out as much hose length as needed without damage to the surrounding vegetation. In this manner a temporary hose guide 13 may be placed adjacent to new vegetation or to protect other fragile items such as the gas lamp whose filament can be damaged by shaking of the support stand. Pulling hose 100' from behind the bushes 122 will not cause shaking to the pole as the temporary hose guide can maintain the hose a distance from the pole base.

As previously mentioned, a hose guide as enumerated by 13' may also be placed along a corner of the bushes 122 should the end 126 of the hose 100' need to be directed towards a remote location such as that depicted by flower bed 128.

Thus, the hose guide device operates as both a permanent and temporary hose guiding device that may be adjusted to the particular circumstances and landscape needs of the home. In addition, the temporary aspect of the hose guide allows for ease of directing a hose around any type of item such as a car, boat, or bicycle so as to protect such items from damage during movement of the hose. By combining multiple hose guides a garden hose may be maneuvered into a hard to reach area such as that provided by a vegetable garden, not shown, wherein low pressure watering of tender plants is required.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A water hose guide device comprising: a spike having a pointed insertion end separated from a flat distal end by a side wall surface having a length, said side wall including outwardly extending ribs with at least one locking tab integrated along the length thereof at a predefined distance from said flat distal end; a one piece roller member with an upper surface having a first diameter and a lower surface having a second diameter with a C-shaped side wall formed therebetween, said roller having a centrally disposed aperture receptive to the rotatable insertion of said spike and positionable between said locking tab and said flat distal end; wherein said insertion end of said spike is placed through said aperture of said roller positioning said roller between said locking tab and said flat distal end whereby said spike is insertable into the ground and said roller rotatable about a vertical axis formed by said spike receptive to guiding a hose along said C-shaped side wall.

2. The water hose guide device according to claim 1 wherein said spike is further defined as having four outwardly extending ribs forming a cross-section, each said locking tab located on an outer peripheral edge formed from each said tab.

3. The water hose guide device according to claim 1 wherein said spike and said roller member is constructed of plastic.

4. The water hose guide device according to claim 1 wherein said locking tab is uni-directional having a side wall sloped outwardly from said rib a predefined distance leading to a raised ridge having an upper surface formed perpendicular to said spike providing a support shoulder allowing the rotation of said roller thereon.

5. The water hose guide device according to claim 1 wherein said roller has a height of approximately 2.5 inches with said upper surface having a diameter greater than a diameter of said lower surface.

6. The water hose guide device according to claim 5 wherein said diameter of said upper surface is approximately 3.375 inches and said diameter of said lower surface is approximately 2.645 inches.

7. The water hose guide device according to claim 1 wherein said aperture includes an upper opening having a diameter of approximately 0.865 inches and a lower diameter opening of approximately 0.880 inches.

8. The water hose guide device according to claim 1 wherein said C-shaped section is formed by a radii of about 0.75 inches.

9. The water hose guide device according to claim 1 wherein said flat distal end includes an enlarged lip extending over the peripheral end of said ribs providing a shoulder for engaging a portion of said upper surface of said roller member.

10. A water hose guide device comprising: a one piece plastic spike having a pointed insertion end separated from an enlarged flat distal end by a side wall surface having a length, said side wall including four outwardly extending ribs forming a cross section with a uni-directional locking tab integrated along the length of each said rib at a predefined distance from said flat distal end; a one piece plastic roller member with an upper surface having a first diameter and a lower surface having a second diameter with said upper surface having a diameter greater than a diameter of said lower surface and a C-shaped side wall formed therebetween, said roller having a centrally disposed aperture receptive to the rotatable insertion of said spike and positionable between said locking tab and said flat distal end; wherein said insertion end of said spike is placed through said aperture of said roller positioning said roller between said locking tab and said flat distal end whereby said spike is insertable into the ground and said roller rotatable about a vertical axis formed by said spike receptive to guiding a hose along said C-shaped side wall.

11. The water hose guide device according to claim 10 wherein said diameter of said upper surface is approximately 3.375 inches and said diameter of said lower surface is approximately 2.645 inches.

12. The water hose guide device according to claim 10 wherein said aperture includes an upper opening having a diameter of approximately 0.865 inches and a lower diameter opening of approximately 0.880 inches.

13. The water hose guide device according to claim 10 wherein said C-shaped section is formed by a radii of about 0.75 inches.

* * * * *